April 16, 1940.  E. SCHULZE-HERRINGEN  2,197,485

COMMON WAVE TRANSMITTING SYSTEM

Filed June 17, 1937

Inventor:
Erich Schulze-Herringen
by R.C. Hapgood
Attorney

Patented Apr. 16, 1940

2,197,485

UNITED STATES PATENT OFFICE 2,197,485

COMMON WAVE TRANSMITTING SYSTEM

Erich Schulze-Herringen, Berlin - Tempelhof, Germany, assignor to C. Lorenz Aktiengesellschaft, Berlin-Tempelhof, Germany, a company Application June 17, 1937, Serial No. 148,628
In Germany June 18, 1936

4 Claims. (Cl. 250—17)

The invention relates to common or single wave radio transmitting systems, that is, systems which comprise a main transmitter and secondary transmitters operating all on the same wave-length. With arrangements of this kind it is well known to operate the secondary transmitters by self-excitation and to control the operation thereof by a device that depends on phase or frequency conditions. To such end, a frequency derived from the main transmitter and a frequency derived from the secondary transmitter are conveyed to an equipment, such as a bridge arrangement, adapted to regulate the frequency of the secondary transmitter whenever this frequency happens not to accord with the frequency of the main transmitter.

Such regulating device thus acts to compare the frequencies with each other, and this comparison is in general effected with the aid of low frequencies or mean frequencies obtained by a frequency division. Also it has been proposed to compare the transmission frequencies directly with each other. The arrangement is usually such that a low frequency is derived from the main transmitter and is conveyed along cable lines to the secondary transmitter. At the secondary transmitter either a similar frequency division is effected in order to compare the low frequencies with each other, or the frequency arriving from the main transmitter is by multiplication equalised to the frequency of the secondary transmitter, whereupon the said comparison is effected.

The invention provides for both the frequency derived from the secondary transmitter and the frequency arriving from the main transmitter to be multiplied to form a multiple of the transmitting frequency, the two then being compared with each other.

Figure 1:
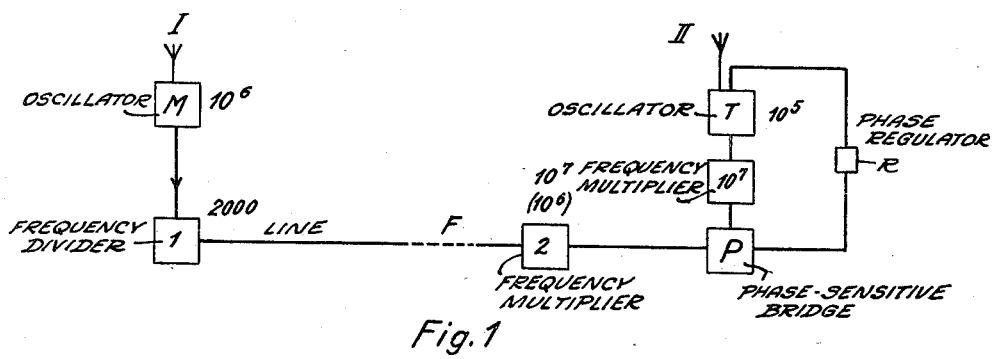
Figure 2:
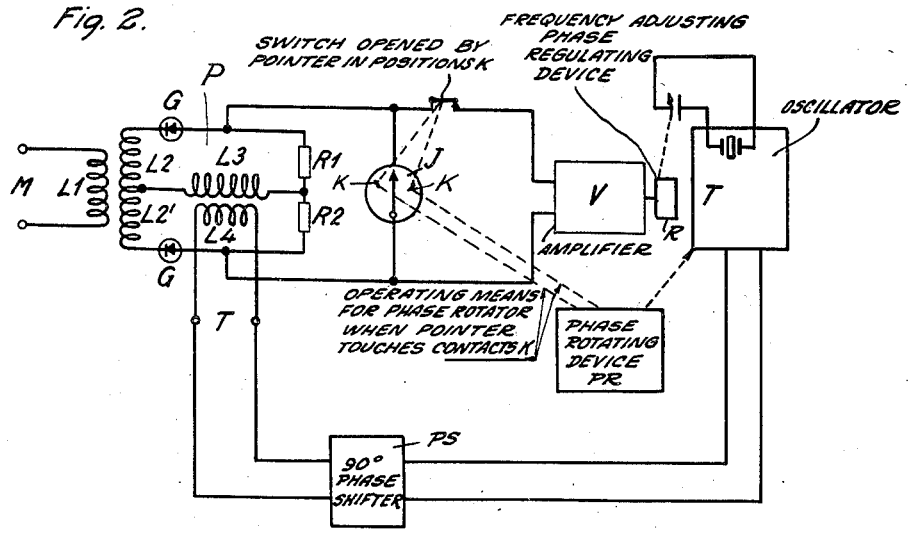

The advantages of arrangements as provided by the invention will appear from the following description, reference being had to the accompanying drawing in which Fig. 1 is a diagrammatic view showing a representative example of the novel system, Fig. 2 is a wiring diagram of an arrangement forming part of the system illustrated in Fig. 1.

It has been experienced that phase shifts along the cable line occur when the low frequency derived from the main transmitter is being transferred, such phase shifts requiring the frequency of the secondary transmitter to be re-adjusted at once. In order now to add to the accuracy of regulation the said additional multiplication, that only serves the comparison aimed at, is effected.

In Fig. 1, I denotes a main transmitter, II a secondary transmitter. The control stages of the two are designated M or T, respectively. The frequency is assumed to be $10^6$ cycles per second. The frequency of the main transmitter is conveyed to a frequency dividing device 1 which causes this frequency to be divided by 500, for example, thus being reduced to a frequency of 2000 cycles. This low frequency is conveyed over a long distance line F to the secondary transmitter II where a multiplication device 2 acts to reproduce the transmitting frequency of $10^6$ cycles. In the hitherto known arrangements this frequency, taken from device 2, is directly compared with the frequency of transmitter II which likewise amounts to $10^6$ cycles, such comparison being accomplished in a control device P which is a phase bridge, for instance. In case of incidental variations the frequency of transmitter II is corrected by a regulating device R.

In accordance with the invention, in each lead to the device P a multiplication device 2 is included by which a multiplication to $10^7$ cycles, for instance, is effected. The device P thus has an accuracy which is ten times the value it has in the hitherto known arrangements. For example, whenever a phase shift of 1° occurs in the line F, then in the region after the multiplication stage 2 a phase variation of 500° would occur. Since however multiples of $2\pi$ are not taken into consideration a phase variation of 240° results which is readjusted by the control device P. Phase shifts in line F which are too small to be dealt with by the hitherto known regulating devices are regulated by an arrangement according to the invention, because in the example herebefore set forth the accuracy is ten times the customary value. Depending upon the desired accuracy a still greater multiplication may be adopted.

In Fig. 2 an example of a phase bridge is shown. The frequency arriving from the main transmitter, and which is of $10^7$ cycles, is conveyed over a coupling coil L1 to the arms L2, L2' of the bridge arrangement. In these arms rectifiers G are included. The other arms of the bridge arrangement are constituted by resistances R1, R2. Located between two corners of the bridge is a coil L3 to which the frequency of the secondary transmitter, dephased by 90° in phase shifter PS is conveyed over a coil L4. The two other corners of the bridge are connected to a pointer instrument J and to an amplifying device V which in its turn over regulating device R of any suitable kind, such as a condenser connected in parallel with the oscillatory circuit, acts upon the quartz or control stage T of the secondary transmitter.

Any known form of drive may be used, for example, one of the type shown in U. S. Patent 1,447,773, March 6, 1923.

In accordance with a further feature of the invention, the instrument J is such that with large deflections of its pointer, that is, deflections beyond a certain predetermined angle the regulating device actuated by the phase bridge shall be disconnected as indicated at switch S. This is done with the aid of contacts K arranged to cooperate with the pointer. In such event, however, the compensation current passing through instrument J does not cease to flow. When this regulating device is disconnected in this way, a phase rotating arrangement PR is rendered operative which in the case of great phase shifts acts to bring back the phase of the secondary transmitter until the deflection of the pointer proves to be less than the angle predetermined by the contacts K. This phase rotating device may be of any known type, for example, of the type shown in U. S. Patent 2,063,500, December 8, 1936. On opening the previously closed contact K the regulating device of the phase bridge is again cut in and now acts slowly to regulate the quartz of the secondary transmitter.

Arrangements as provided by the invention allow of a faultless regulation in the case of small phase or frequency variations and also enable a faultless quick correction in the case of great variations which are due to suddenly occurring great phase shifts, such for instance as may occur in the long distance line by which the frequency derived from the main transmitter is transferred to the secondary transmitter.

What is claimed is:

1. A common frequency wave transmission system comprising a main transmitter for radiating at said common frequency, at least one secondary radiating transmitter, means to derive from said main transmitter a control frequency lower than said common frequency, means to transmit said control frequency to the secondary transmitter and to multiply it to a multiple of said common frequency, means to derive a control frequency from the secondary transmitter which is also a multiple of said common frequency, a phase sensitive device common to both said control frequencies for comparing them, means for automatically regulating the phase by frequency adjustment of said secondary transmitter under control of said phase sensitive device, a phase rotating device responsive to said phase sensitive device, and means responsive to a predetermined phase displacement at said phase sensitive device to disable the phase regulating device and to connect said phase rotating device into controlling relation to said secondary transmitter.

2. A common frequency wave transmission system comprising a main transmitter for radiating at said common frequency, at least one secondary radiating transmitter, means to derive from said main transmitter a control frequency lower than said common frequency, means to transmit said control frequency to the secondary transmitter and to multiply it to a multiple of said common frequency, means to derive a control frequency from the secondary transmitter which is also a multiple of said common frequency, a phase sensitive device common to both said control frequencies for comparing them, means for automatically regulating the phase by frequency adjustment under control of said phase sensitive device, a phase rotating device responsive to said phase sensitive device, and an instrument responsive to phase displacement at said phase sensitive device to disable the phase regulating device and to connect the phase rotating device in controlling relation to said secondary transmitter.

3. A common frequency wave transmission system comprising a main transmitter for radiating at said common frequency, at least one secondary radiating transmitter, means to derive from said main transmitter a control frequency lower than said common frequency, means to transmit said control frequency to the secondary transmitter and to multiply it to a multiple of said common frequency, means to derive a control frequency from the secondary transmitter which is also a multiple of said common frequency, a phase sensitive device common to both said control frequencies for comparing them, means for automatically regulating the phase by frequency adjustment of said secondary transmitter under control of said phase sensitive device, a phase rotating device responsive to said phase sensitive device, an instrument arranged to disable the phase regulating device and to connect the phase rotating device in controlling relation to said secondary transmitter, said instrument having a pointer movable in accordance with phase displacement at said phase sensitive device, and contacts arranged in cooperative relationship with said pointer to disable said phase sensitive device upon a predetermined displacement of said pointer.

4. A common frequency wave transmission system comprising a main transmitter for radiating at said common frequency, at least one secondary radiating transmitter, means to derive from said main transmitter a control frequency lower than said common frequency, means to transmit said control frequency to the secondary transmitter and to multiply it to a multiple of said common frequency, means to derive a control frequency from the secondary transmitter which is also a multiple of said common frequency, a phase sensitive device common to both said control frequencies for comparing them, means for automatically regulating the phase by frequency adjustment of said secondary transmitter under control of said phase sensitive device, a phase rotating device responsive to said phase sensitive device, an instrument connected to said phase sensitive device and responsive thereto arranged to disable the phase regulating device and to connect the phase rotating device in controlling relation in response to current through said instrument greater than a predetermined value and to reconnect said phase sensitive device and disconnect said phase rotating device in response to a decrease of said current below said predetermined value.

ERICH SCHULZE-HERRINGEN.